(12) United States Patent
Uchiyama et al.

(10) Patent No.: US 8,499,905 B2
(45) Date of Patent: Aug. 6, 2013

(54) FRONT FORK (75) Inventors: Mikio Uchiyama, Saitama (JP); Kazuhiko Gogo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 519 days.

(21) Appl. No.: 12/693,845

(22) Filed: Jan. 26, 2010

(65) Prior Publication Data
US 2010/0207350 A1 Aug. 19, 2010

(30) Foreign Application Priority Data

Feb. 16, 2009 (JP) ................................. 2009-032155

(51) Int. Cl.
*F16F 9/06* (2006.01)
(52) U.S. Cl.
USPC ........... 188/276; 188/266; 188/280; 188/297; 188/300; 188/315; 188/322.13; 188/322.15; 188/322.16; 188/322.17; 188/322.19; 267/64.28; 267/64.15; 280/5.515; 280/276; 280/279
(58) Field of Classification Search
USPC 188/266, 280, 288, 300, 315, 322.16–322.18, 188/297; 267/266, 64.11–64.12; 280/276, 280/284
See application file for complete search history.

(56) References Cited

U.S. PATENT DOCUMENTS

| | | | | |
|---|---|---|---|---|
| 6,997,293 B2* | 2/2006 | Tomonaga et al. | ........... | 188/315 |
| 2005/0127587 A1* | 6/2005 | Nagai | ........... | 267/266 |
| 2005/0178624 A1* | 8/2005 | Nagai | ........... | 188/266 |
| 2008/0230335 A1* | 9/2008 | Furuya et al. | ........... | 188/315 |
| 2009/0302558 A1* | 12/2009 | Shirai | ........ | 280/5.515 |

FOREIGN PATENT DOCUMENTS

| | | |
|---|---|---|
| JP | 11-280826 A | 10/1999 |
| JP | 2005-30534 A | 2/2005 |

\* cited by examiner

*Primary Examiner* — Robert A Siconolfi
*Assistant Examiner* — San Aung
(74) *Attorney, Agent, or Firm* — Birch, Stewart, Kolasch & Birch, LLP (57) ABSTRACT

A front fork for easily optimizing an oil quantity in a damper cylinder with a relatively simple structure without affecting operability of a free piston even in an assembled state. An escape portion is formed on an outer periphery of a piston rod at a position where a seal member mounted on a sealing cap faces in an opposed manner when a front fork extends to the maximum.

16 Claims, 6 Drawing Sheets

FRONT FORK

CROSS-REFERENCE TO RELATED APPLICATIONS

The present application claims priority under 35 USC 119 to Japanese Patent Application No. 2009-032155 filed on Feb. 16, 2009 the entire contents of which are hereby incorporated by reference.

BACKGROUND OF THE INVENTION

1. Field of the Invention

The present invention relates to a front fork of a saddle-ride-type vehicle.

2. Description of Background Art

A conventional front fork is known wherein a communication hole is formed in a casing portion which defines a gas chamber (volume compensation chamber) behind a free piston and oil in a cylinder body is released to a reservoir so that an increase in pressure in the cylinder body is avoided thus easily ensuring a predetermined gas spring force against the free piston. See, for example, JP-A-2005-30534.

The front fork described in JP-A-2005-30534 adopts the structure where oil in the cylinder body is discharged at a point in time wherein oil is compressed the most. Thus, a maximum compressed state appears during traveling at relatively low frequency or it is necessary to contract the front fork by applying a load to the front fork. Accordingly, it is difficult to provide the quantity of oil to an optimum oil quantity. Further, it is necessary to form a stepped portion on a casing portion and this formation of the stepped portion becomes a factor which pushes up the cost. Still further, the free piston adopts the structure where the piston includes two seals which are brought into slidable contact with an outer peripheral surface of the casing portion. Thus, a contact area of the seal portions with the outer peripheral surface of the casing portion is large whereby a friction is increased thus giving rise to a possibility that the seal portions adversely affect the operability of the free piston.

SUMMARY AND OBJECTS OF THE INVENTION

According to an embodiment of the present invention, a front fork is provided which can easily optimize an oil quantity in a damper cylinder with a relatively simple structure without affecting the operability of a free piston.

According to an embodiment of the present invention, a front fork includes a vehicle-body-side tube and a wheel-side tube which are slidably engaged with each other in a fitting engagement. A damper cylinder is disposed upright in the inside of vehicle-body-side tube with a piston rod being disposed upright in the inside of wheel-side tube and is inserted into the inside of the damper cylinder. A main piston is mounted on the piston rod such that the main piston is brought into slidable contact with an inner peripheral surface of the damper cylinder and partitions the inside of the damper cylinder into a rod-side oil chamber and a piston-side oil chamber with a damping force generating device being operatively connected thereto. A sub piston is slidably disposed in the inside of the damper cylinder above the main piston and is brought into slidable contact with the inner peripheral surface of the damper cylinder to partition the inside of the damper cylinder into the piston-side oil chamber and a sub tank chamber. A compression-side damping force generating device is provided together with a free piston which is disposed in the inside of the damper cylinder above the sub piston and pressurizes an oil chamber in the inside of the damper cylinder. A sealing cap is mounted on an opening portion below the damper cylinder to allow the piston rod to penetrate therethrough, and has a seal member which is brought into slidable contact with an outer periphery of the piston rod for hermetically sealing the oil chambers in the inside of the damper cylinder from the oil chamber outside the damper cylinder. The piston rod includes a communication passage which allows the oil chambers in the inside of the damper cylinder and the oil chamber outside the damper cylinder to be in communication with each other when the front fork assumes a predetermined extension position from a ride-on stopping time to a fork maximum extended time.

According to an embodiment of the present invention, the communication passage is provided so as to allow the oil chambers in the inside of the damper cylinder and the oil chamber outside the damper cylinder to be in communication with each other when the front fork assumes an extension position at least at the fork maximum extended time.

According to an embodiment of the present invention, the communication passage is an escape portion which is formed on an outer periphery of the piston rod which faces the seal member in an opposed manner at the predetermined extension position of the front fork.

According to an embodiment of the present invention, the escape portion is constituted of a straight portion having a uniform outer diameter ranging from the predetermined extension position of the front fork to the main piston side.

According to an embodiment of the present invention, the communication passage is formed of a first blow hole which radially penetrates the piston rod on a more main-piston side than an axial position of the piston rod which faces the seal member when the front fork assumes the predetermined extension position, and a second blow hole which radially penetrates the piston rod on a more opposite main-piston side than the axial position.

According to an embodiment of the present invention, the piston rod includes the communication passage which allows the oil chambers in the inside of the damper cylinder and the oil chamber outside the damper cylinder to be in communication with each other when the front fork assumes at least one extension position from a ride-on stopping time to a fork maximum extended time. Accordingly, when the front fork is extended by a predetermined quantity, an oil quantity in the damper cylinder can be optimized so that the frequency of adjustment of the oil quantity is increased even during traveling, and it is sufficient to lift up a vehicle body even at the time of stopping the vehicle. Further, different from the prior art, it is unnecessary to form a stepped portion on a casing portion or to increase the number of seals mounted on the free piston. Accordingly, it is possible to optimize an oil quantity in a damper cylinder without substantially influencing the operability of the free piston with the relatively simple structure.

According to an embodiment of the present invention, the communication passage is provided so as to allow the oil chambers in the inside of the damper cylinder and the oil chamber outside the damper cylinder to be in communication with each other when the front fork assumes the extension position at least at the fork maximum extended time. Accordingly, even during usual riding, it is possible to optimize an oil quantity in the damper cylinder at the fork maximum extended time. Thus, the feeling of a rider is not influenced.

According to an embodiment of the present invention, the communication passage is the escape portion which is formed on the outer periphery of the piston rod which faces the seal member in an opposed manner at the predetermined extension position of the front fork. Thus, it is possible to form the communication passage by merely forming the escape portion in the piston rod.

According to an embodiment of the present invention, the escape portion is constituted of the straight portion having a uniform outer diameter ranging from the predetermined extension position of the front fork to the main piston side. Thus, it is possible to form the escape portion more easily.

According to an embodiment of the present invention, the communication passage is formed of the first blow hole which radially penetrates the piston rod on the more main-piston side than the axial position of the piston rod which faces the seal member in an opposed manner when the front fork assumes the predetermined extension position, and the second blow hole which radially penetrates the piston rod on the more opposite main-piston side than the axial position. Accordingly, it is possible to form the communication passage by merely forming two blow holes in the piston rod.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a front fork according to respective embodiments of the present invention is explained in conjunction with FIG. 1 and FIG. 2.

Figure 1:
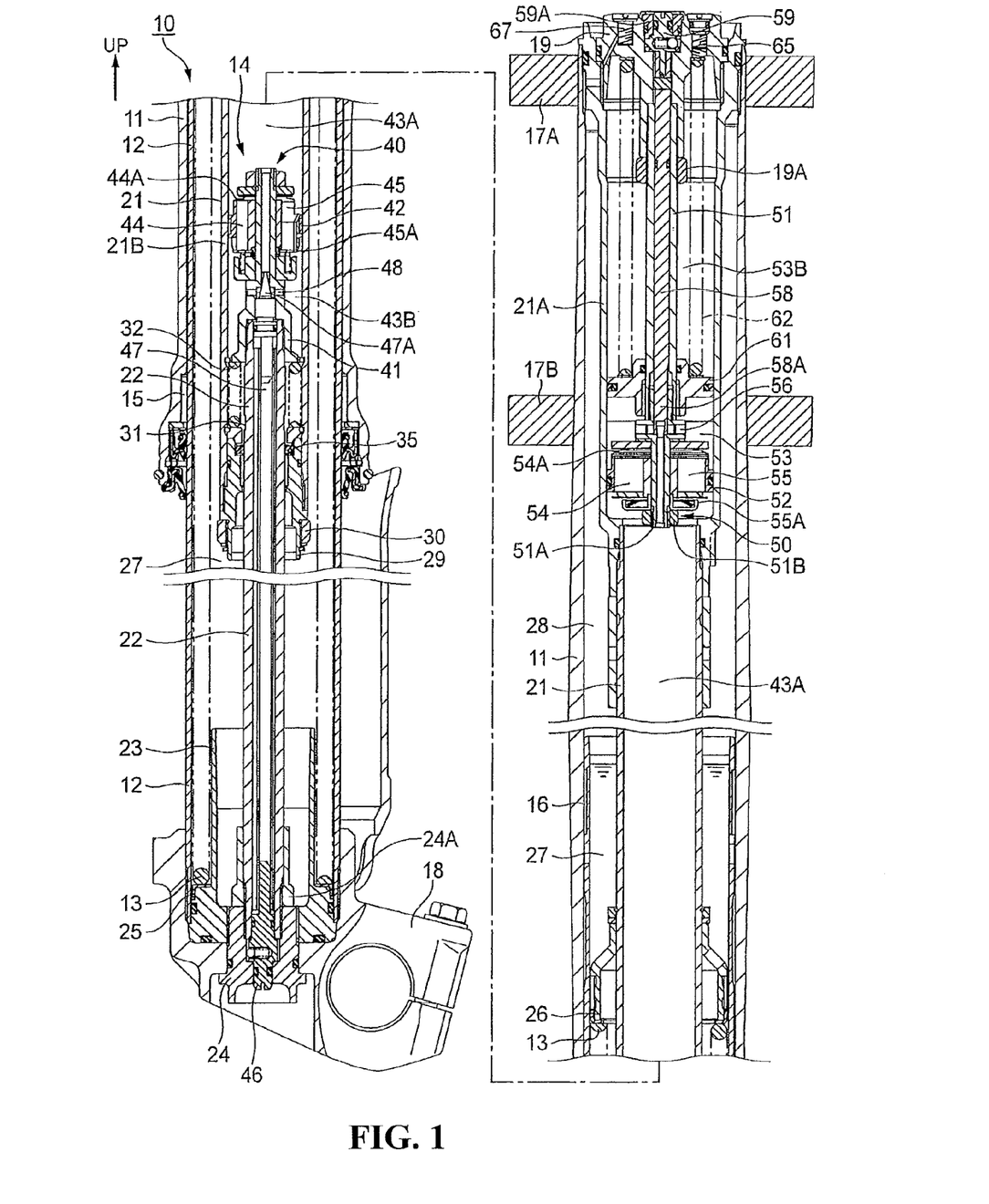
FIG. 1 is a cross-sectional view with a part broken away of a front fork of a first embodiment of the present invention.

As shown in FIG. 1, a front fork 10 is constituted such that a wheel-side tube (inner tube) 12 is slidably inserted into a vehicle-body-side tube (outer tube) 11 and a suspension spring 13 is interposed between both tubes 11, 12. A single-cylinder-type damper 14 is disposed in the inside of front fork 10 in an inverted posture.

A bushing 15 is provided wherein an outer peripheral portion of the wheel-side tube 12 is brought into slidable contact and is fitted in an inner peripheral portion of a lower end of the vehicle-body-side tube 11. A bushing 16 is provided wherein an inner peripheral portion of the vehicle-body-side tube 11 is brought into slidable contact and is fitted on an outer peripheral portion of an upper end of the wheel-side tube 12.

The vehicle-body-side tube 11 is supported on a vehicle body side by way of an upper bracket 17A and a lower bracket 17B, and the wheel-side tube 12 is joined to an axle by way of an axle bracket 18.

An upper end portion of a damper cylinder 21 (upper cylinder tube 21A) of the damper 14 is hermetically threadedly mounted on an upper end portion of the vehicle-body-side tube 11 by way of an O ring. Further, an opening formed in an upper end portion of the upper cylinder tube 21A is closed by a fork bolt 19 which is hermetically threadedly mounted on an inner periphery of the upper cylinder tube 21A by way of an O ring. The damper cylinder 21 of the damper 14 is constituted of a joint body which is dividable into two parts consisting of upper and lower cylinder tubes 21A, 21B for facilitating the assembling of a base valve device 50 into the damper cylinder 21 or the like.

An oil locking collar 23 is hermetically fitted on an inner periphery of a lower end portion of the wheel-side tube 12 by way of an O ring, and the oil locking collar 23 is hermetically fixed to the axle bracket 18 by way of an O ring using a bottom bolt 24. Further, a proximal end portion of a piston rod (hollow rod) 22 of the damper 14 is threadedly mounted on the bottom bolt 24, and is also locked by a locking nut 24A. A distal end portion of the piston rod 22 is inserted into the damper cylinder 21.

The piston rod 22 penetrates a sealing member 35 which is mounted on a sealing cap 29 threadedly mounted on an opening portion which is formed in a lower end side of the damper cylinder 21 and is inserted into the inside of the damper cylinder 21 (lower cylinder tube 21B). The sealing member 35 hermetically seals a rod-side oil chamber 43B described later of the damper cylinder 21 thus exhibiting a sealing function of preventing oil in the oil chamber 43B from being leaked to the outside of the damper cylinder. At a position below the sealing member 35, a guide bushing 49 is inserted between the piston rod 22 and the sealing cap 29. On an outer peripheral portion of a lower end portion of the sealing cap 29, an oil locking piece 30 is loosely fitted. Further, a rebound spring 32 is supported on an axially upper end surface of the sealing cap 29.

The suspension spring 13 is interposed between a spring retainer 25 which is mounted on an outer peripheral surface of a proximal end portion of the oil locking collar 23 and a spring retainer 26 which is fixed to an outer peripheral surface of an intermediate portion of the damper cylinder 21 (lower cylinder tube 21B). Further, an foil chamber 27 and a gas chamber 28 are formed in the inside of vehicle-body-side tube 11 and the wheel-side tube 12, and gas which is sealed in the gas chamber 28 constitutes a gas spring. A resilient repulsive force of the suspension spring 13 and the gas spring absorbs an impact which the vehicle receives from a road surface.

The damper 14 includes a piston valve device (extension-side damping force generating device) 40 and the base valve device (compression-side damping force generating device) 50. The damper 14 suppresses extension/contraction vibrations of the vehicle-body-side tube 11 and the wheel-side tube 12 due to a damping force generated by the piston valve device 40 and the base valve device 50.

In the piston valve device 40, a piston holder 41 is mounted on a distal end portion of the piston rod 22 and a main piston 42 is mounted on the piston holder 41. The main piston 42 is brought into slidable contact with an inner portion of the damper cylinder 21 and partitions the inside of the damper cylinder 21 into a piston-side oil chamber 43A in which the piston rod 22 is not housed and a rod-side oil chamber 43B in which the piston rod 22 is housed. The main piston 42 includes an extension-side flow passage 44 which has an extension-side valve 44A and communicably connects the piston-side oil chamber 43A and the rod-side oil chamber 43B to each other, and a compression-side flow passage 45 which has a compression-side valve 45A and communicably connects the piston-side oil chamber 43A and the rod-side oil chamber 43B to each other.

Further, in the piston valve device 40, a damping force adjusting rod 47 which is connected to an adjuster 46 pivotally supported on the bottom bolt 24 is inserted into a hollow portion of the piston rod 22. By a needle 47A formed on a distal end of the damping force adjusting rod 47 which advances and retracts in the axial direction due to a rotational operation of the adjuster 46, a flow passage area of a bypass passage 48 which is formed in the piston holder 41 between the piston-side oil chamber 43A and the rod-side oil chamber 43B can be adjusted.

In the base valve device 50, a guide rod 51 is threadedly mounted on the previously-mentioned fork bolt 19, the guide rod 51 is fixed by the locking nut 19A, and a sub piston 52 is held on a distal end portion of the guide rod 51 using a nut 51B and the like. The sub piston 52 is hermetically brought into contact with an inner peripheral portion of the upper cylinder tube 21A, and a sub tank chamber 53 is formed or defined above the above-mentioned piston-side oil chamber 43A. The sub piston 52 includes a compression-side flow passage 54 which has a compression-side valve 54A and allows the piston-side oil chamber 43A and the sub tank chamber 53 to be communicably connected with each other, and an extension-side flow passage 55 which has an extension-side valve 55A and allows the piston-side oil chamber 43A and the sub tank chamber 53 to be communicably connected with each other. Further, a housing holder 51A includes a bypass flow passage 56 which allows the piston-side oil chamber 43A and the sub tank chamber 53 to be communicably connected with each other by bypassing the compression-side flow passage 54 and the extension-side flow passage 55.

A damping force adjusting rod 58 which is threadedly mounted on the fork bolt 19 includes an adjuster 59, and is inserted into the guide rod 51. The damping force adjusting rod 58 can adjust a flow passage area of the bypass flow passage 56 using a needle 58A which is formed on a distal end of the damping force adjusting rod 58 and advances and retracts in the axial direction due to a rotational operation of the adjuster 59. Here, the fork bolt 19 holds the adjuster 59 and a holder 59A for holding the adjuster 59 on a center portion of an end surface of a head portion thereof in an embedded manner.

Further, the base valve device 50 includes a free piston 61 which slides hermetically along the cylinder tube 21A and the guide rod 51 by way of an O ring and a bushing in the inside of the upper cylinder tube 21A. Due to the provision of the free piston 61, the sub tank chamber 53 which is communicated with the piston-side oil chamber 43A on a sub-piston-52 side of the sub tank chamber 53, and a volume compensation chamber 53B on a side of the fork bolt 19 in which gas is stored are defined. A spring 62 is interposed between the free piston 61 and the fork bolt 19 so as to have a predetermined initial pressurizing load. On a side portion of an end surface of a head portion of the fork bolt 19, a discharge plug 65 is threadedly mounted in a detachable manner. The discharge plug 65 is provided for discharging gas which enters the gas chamber 28 from a slide portion of the vehicle-body-side tube 11 and the wheel-side tube 12 due to the extension/contraction of the front fork 10. Further, on a side portion of the end surface of the head portion of the fork bolt 19, the adjustment plug 67 for adjusting atmospheric pressure and a quantity of oil in the volume compensation chamber 53B is threadedly mounted in a detachable manner. The gas chamber 28 and the volume compensation chamber 53B are partitioned by the upper cylinder tube 21A for preventing the communication therebetween.

When the piston rod 22 advances into or retracts from the damper cylinder 21, the free piston 61 is moved vertically so as to compensate for a change in quantity of oil in the damper cylinder 21 corresponding to an advancement volume or a retraction volume of the piston rod 22. The spring 62 is contracted at when the oil is compressed due to the advancement of piston rod 22 into the inside of the damper cylinder 21. Thus, an oil chamber in the inside of the damper cylinder 21 is pressurized by an amount of a spring load of the spring 62 at this time.

Accordingly, the front fork 10 performs the damping operation as follows.

When the front fork 10 is compressed, in the base valve device 50, a compression-side damping force is generated due to the needle 58A of the sub piston 52 or oil which flows in the compression-side valve 54A. To be more specific, a quantity of oil corresponding to an advancement volume of the piston rod 22 which advances into the damper cylinder 21 is discharged to the sub tank chamber 53 from the piston-side oil chamber 43A after passing through the bypass flow passage 56 of the sub piston 52 or the compression-side flow passage 54. Here, when a relative speed between the damper cylinder 21 and the piston rod 22 is low, a compression-side damping force can be obtained due to a throttle resistance caused by the needle 58A which is provided to the bypass flow passage 56. The damping force is adjusted by adjusting a position of the needle 58A using the adjuster 59. Further, when the relative speed of the damper cylinder 21 and the piston rod 22 is intermediate or high, oil which passes through the compression-side flow passage 54 from the piston-side oil chamber 43A deflects and deforms the compression-side valve 54A so that oil is guided to the sub tank chamber 53 thus generating a compression-side damping force. On the other hand, in the piston valve device 40, oil in the piston-side oil chamber 43A passes through the compression-side flow passage 45 and opens the compression-side valve 45A so that oil is guided to the rod-side oil chamber 43B thus generating a required predetermined compression-side damping force.

When the front fork 10 is extended, in the piston valve device 40, an extension-side damping force is generated due to oil which flows on the needle 47A of the piston 42 or in the extension-side valve 44A. To be more specific, when a relative speed between the damper cylinder 21 and the piston rod 22 is low, oil in the rod-side oil chamber 43B is guided to the piston-side oil chamber 43A by passing through the bypass passage 48 in which the needle 47A is arranged, and generates an extension-side damping force due to a throttle resistance caused by the needle 47A arranged between the rod-side oil chamber 43B and the piston-side oil chamber 43A. The damping force is adjusted by adjusting a position of the needle 47A by the adjuster 46. When the relative speed of the damper cylinder 21 and the piston rod 22 is intermediate or high, oil in the rod-side oil chamber 43B passes through the extension-side flow passage 44, deflects and deforms the extension-side valve 44A so that oil is guided to the piston-side oil chamber 43A thus generating an extension-side damping force. On the other hand, in the base valve device 50, a quantity of oil corresponding to a retraction volume of the piston rod 22 which retracts from the damper cylinder 21 returns to the piston-side oil chamber 43A from the sub tank chamber 53 after passing through the extension-side flow passage 55 of the sub piston 52 thus generating a desired damping force.

Due to these compression-side and extension-side damping forces, the extension/contraction vibrations of the front fork 10 can be suppressed.

When the front fork 10 is compressed to the maximum, the oil locking piece 30 mounted on a lower end portion of the lower cylinder tube 21B of the damper cylinder 21 is fitted in the oil locking collar 23 which is mounted on a lower end portion of the wheel-side tube 12, and oil which is compressed between the oil locking piece 30 and the oil locking collar 23 generates an oil locking function thus preventing the damper 20 from coming into contact with a bottom of the wheel-side tube 12.

Further, when the front fork 10 is extended to the maximum, a lower end surface of the piston holder 41 which is mounted on the piston rod 22 abuts on the rebound spring 32 which is supported on the sealing cap 29 mounted on the opening portion of the damper cylinder 21 thus providing a stretch-out damping effect.

The oil sealing 35 introduces working oil adhered to an outer peripheral surface of the piston rod 22 which is positioned at the oil chamber 27 defined in the inside of the vehicle-body-side tube 11 and the wheel-side tube 12 into the inside of the damper cylinder 21 for every stroke of the front fork 10. Due to such an operation, working oil in the oil chambers 43A, 43B in the inside of the damper cylinder 21 and the sub tank chamber 53 is gradually increased, and the free piston 61 is moved upwardly due to the increase of working oil. Further, the free piston 61 which is moved upwardly due to surplus oil stored in the respective chambers with time compresses the spring 62, and a biasing force of the spring 62 pressurizes working oil in the damper cylinder 21 thus increasing a rod reaction force. When the vehicle travels under such a state, a rider feels hardness in an operation of the front fork by an amount corresponding to the increase of the rod reaction force.

Further, for example, with respect to an off-road vehicle or the like to which the front fork of the present invention is applied, during riding a motorcycle, a rider never fails to experiences the occurrence of the maximum extension time of the front fork where the front fork assumes a stretch-out state (a state where a wheel floats in gas, even when the front fork does not reach a maximum compressed state).

To cope with such a situation, in this embodiment, at least at a position where the front fork 10 extends to the maximum, an escape portion 31 is formed on an outer periphery of the piston rod 22 which the sealing member 35 mounted on the sealing cap 29 which faces in an opposed manner. The escape portion 31 is an annular groove which is formed by applying a groove forming operation to the outer periphery of the piston rod 22 such that the groove has an axial width larger than an axial width of the sealing lip 35A of the sealing member 35 at a position where the front fork 10 extends to the maximum. The escape portion 31 forms a communication passage which allows the rod-side oil chamber 43B arranged in the inside of the damper cylinder 21 and the oil chamber 27 arranged outside of the damper cylinder 21 to be in communication with each other.

Accordingly, when the front fork is arranged at the position where the front fork assumes a maximum extended state, it is possible to discharge surplus oil which is stored in the damper cylinder 21 to the outside of the damper cylinder 21. Accordingly, it is possible to return a position of the free piston 61 by an amount corresponding to a discharge quantity of surplus oil thus imparting favorable operability to the front fork 10. FIG. 3 illustrates a position of the escape portion 31 at a ride-on stopping time (a position when the vehicle is in a stopping state and one rider rides on the vehicle).

According to this embodiment, when the front fork is arranged at the position where the front fork assumes the maximum extended state, the communication passage which allows the oil chamber 43B arranged in the inside of the damper cylinder 21 and the oil chamber 27 arranged outside of the damper cylinder 21 to be in communication with each other is formed in the piston rod 22. Accordingly, by merely extending the front fork 10 by a predetermined amount, it is possible to optimize an oil quantity in the damper cylinder 21. Further, different from the related art, it is unnecessary to form a stepped portion on a casing portion or to increase the number of sealing members mounted on the free piston. Accordingly, it is possible to optimize an oil quantity in the damper cylinder 21 without substantially influencing the operability of the free piston 61 with the relatively simple structure.

More specifically, in this embodiment, also when a rider operates the vehicle, it is possible to optimize an oil quantity in the damper cylinder 21 at a time when the front fork extends to the maximum where the feeling of a rider is not influenced.

Further, the sealing member 35 is mounted on the sealing cap 29 in a state where the sealing member 35 is brought into slidable contact with the outer periphery of the piston rod 22, and the communication passage is the escape portion 31 which is formed on the outer periphery of the piston rod 22 which faces the sealing member 35 in an opposed manner when the front fork is arranged at a predetermined position. Thus, by merely forming the escape portion 31 on the piston rod 22, it is possible to form the communication passage.

It is sufficient that the position of the escape portion 31 is arranged at a predetermined front fork position from a ride-on stopping time (a position where the vehicle is stopped and one rider rides on the vehicle) to a fork maximum extended state. As in the case of this embodiment, it is preferable that the escape portion 31 may be provided at the position where the front fork assumes at least when the front fork is extended to the maximum.

By constituting the front fork such that the communication passage is formed at the position where no load is applied to the front fork, it is possible to optimize an oil quantity in the damper cylinder 21 in a state where the vehicle is placed on a stand.

Figure 2:
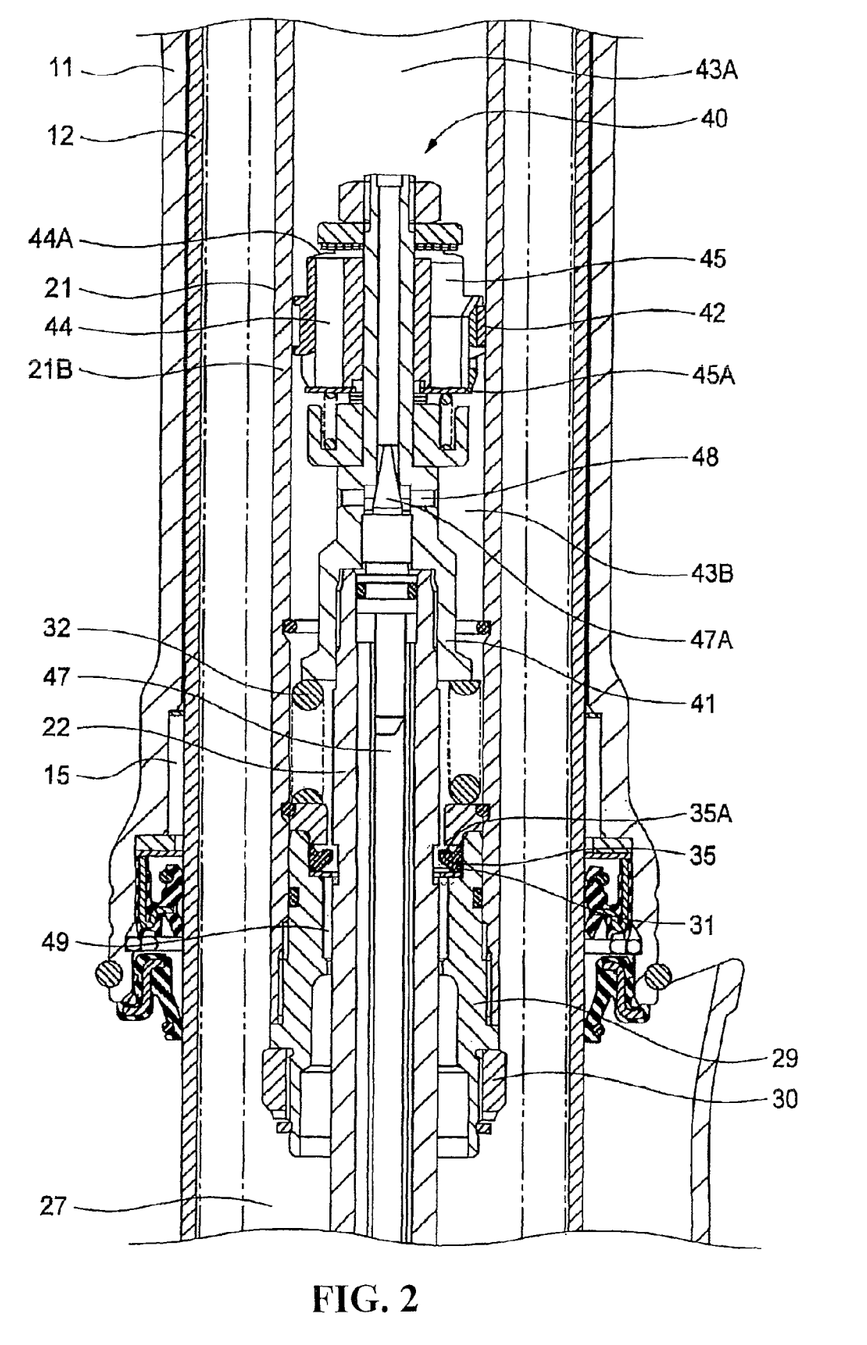
FIG. 2 is an enlarged cross-sectional view of an essential part of the front fork shown in FIG. 1 when the front fork is extended to the maximum.
Figure 3:
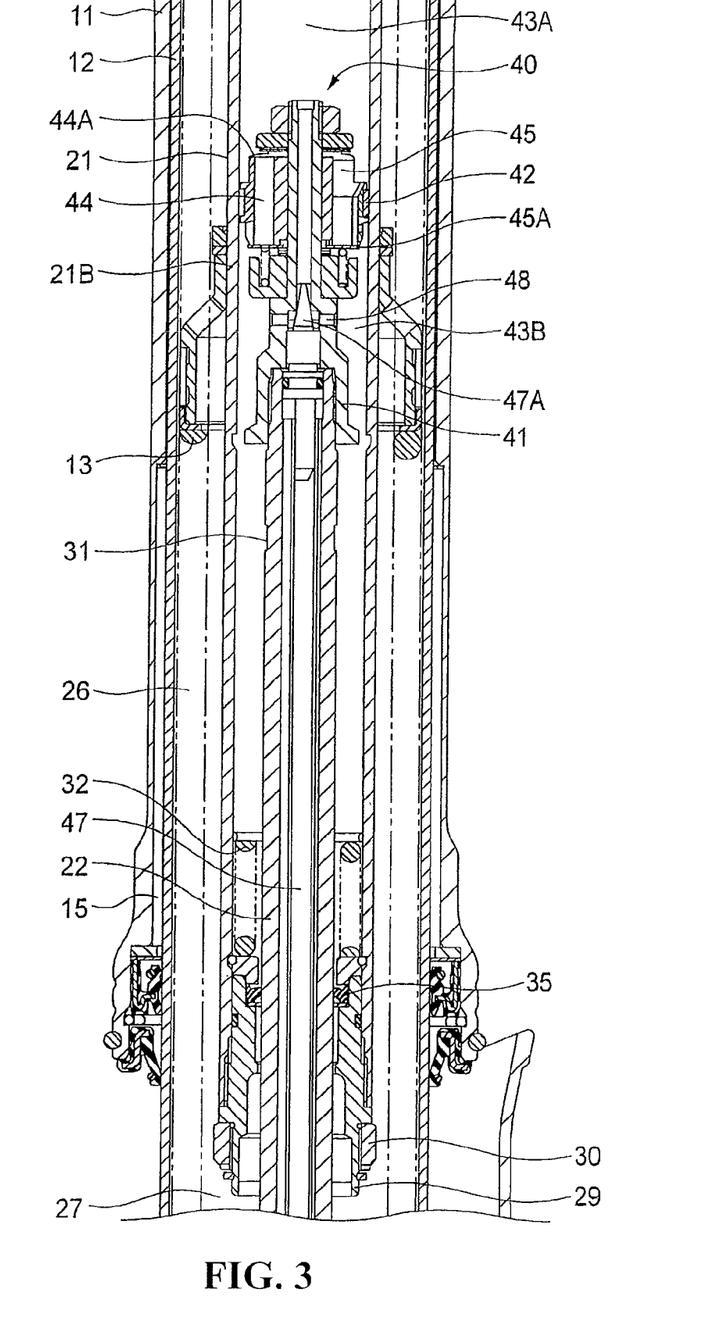
FIG. 3 is an enlarged cross-sectional view showing an essential part of the front fork of the first embodiment of the present invention at a ride-on stopping time.
Figure 4:
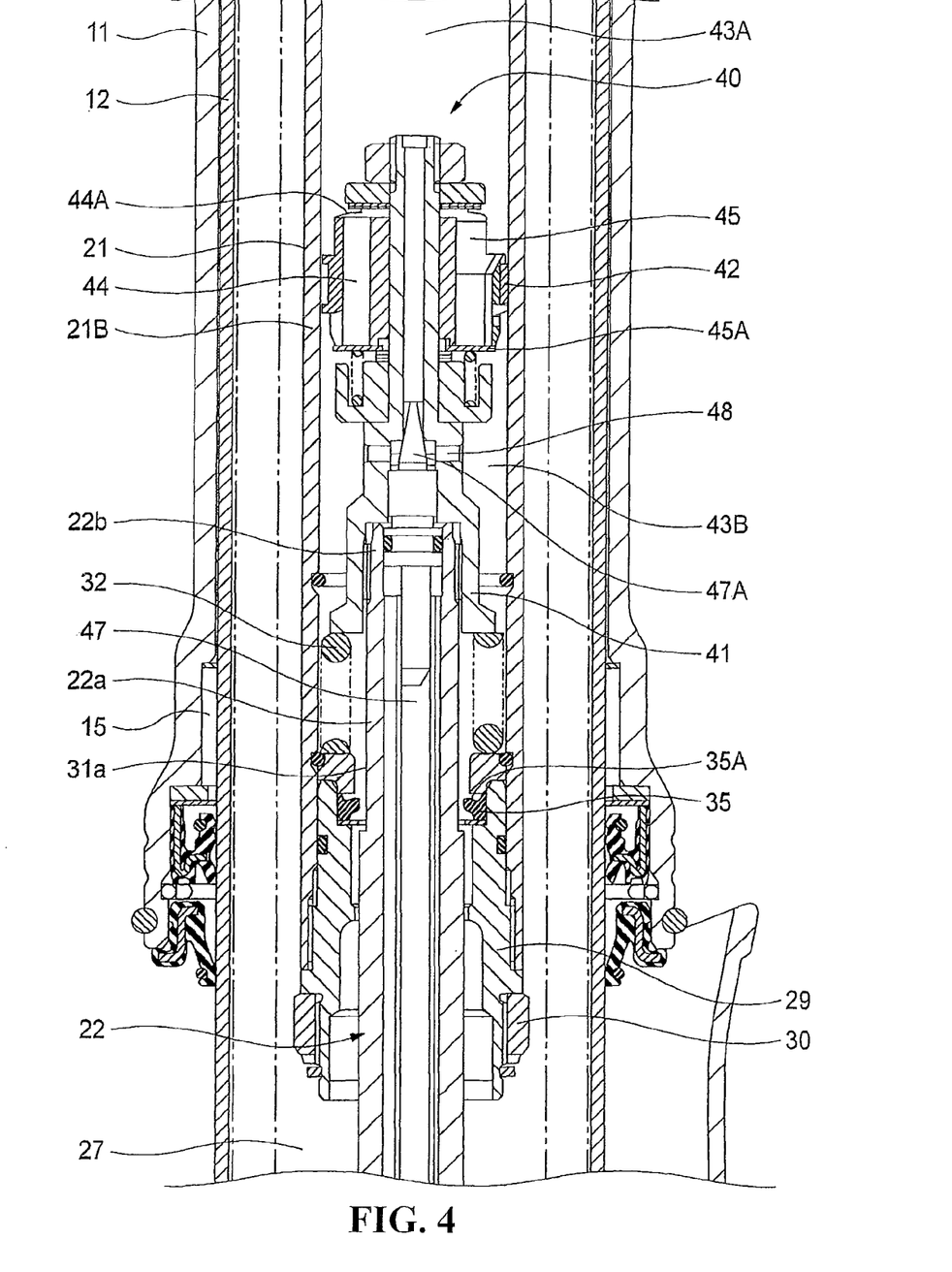
FIG. 4 is an enlarged cross-sectional view showing an essential part of a front fork of a second embodiment of the present invention which corresponds to FIG. 2.

FIG. 4 is an enlarged cross-sectional view of an essential part corresponding to FIG. 2 which shows a front fork according to the second embodiment of the present invention.

In this embodiment, an escape portion 31a is constituted of a straight portion 22a which ranges from an outer periphery of a piston rod 22 with a seal member 35 mounted on a sealing cap 29 facing in an opposed manner to an outer periphery on a main piston side at a position where the front fork 10 extends to the maximum and has a uniform outer diameter. To be more specific, the straight portion 22a is formed ranging from the outer periphery which faces the seal member 35 mounted on the sealing cap 29 in an opposed manner to an area in the vicinity of a proximal portion of a male threaded portion 22b on which a piston holder 41 is threadedly mounted at a position where a front fork 10 extends to the maximum. By forming the escape portion 31a using the straight portion 22a in this manner, it is possible to easily form the escape portion 31a.

Other constitutions and the manner of operation of this embodiment are substantially equal to the corresponding constitutions and manner of operation of the first embodiment.

Figure 5:
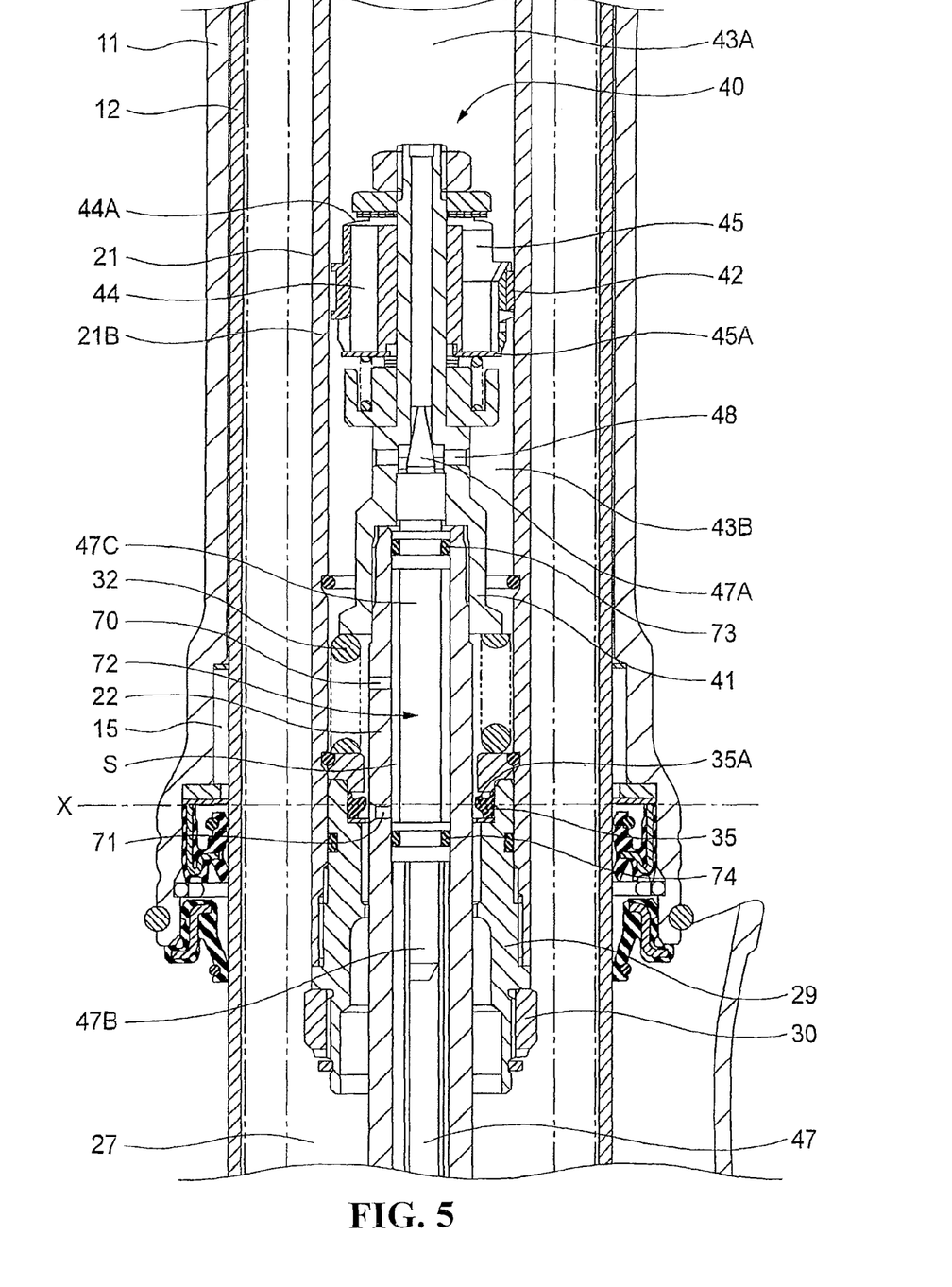
FIG. 5 is an enlarged cross-sectional view showing an essential part of a front fork of a third embodiment of the present invention which corresponds to FIG. 2.

FIG. 5 is an enlarged cross-sectional view of an essential part corresponding to FIG. 2 showing a front fork according to a third embodiment of the present invention.

In this embodiment, a communication passage is formed of a first blow hole 70 which radially penetrates a piston rod 22 on a more main-piston side than an axial position x on an outer peripheral surface of the piston rod 22 with a seal member 35 mounted on a sealing cap 29 facing in an opposed manner at a position where a front fork 10 extends to the maximum, and a second blow hole 71 which penetrates the piston rod 22 radially on a more opposite main-piston side than the axial position.

Further, with respect to a needle member 72 which is fitted on the distal end of a damping force adjusting rod 47 in an integrally rotatable manner, a pair of O rings 73, 74 is arranged on both axial sides between a needle 47A formed on a distal end of the needle member 72 and a proximal portion 47B fitted on the damping force adjusting rod 47. A space S is defined between an outer peripheral surface of an axial intermediate portion 47C of the needle member 72 and the piston rod 22. First and second blow holes 70, 71 formed in the piston rod 22 face the space S.

Accordingly, at the position where the front fork 10 extends to the maximum, residual oil staying in the inside (rod-side oil chamber 43B) of the damper cylinder 21 passes through the first blow hole 70, the space S and the second blow hole 71, may be routed around an oil seal 35, and may be discharged to the outside of the damper cylinder 21.

Accordingly, also in the front fork 10 of this embodiment, it is possible to form the communication passage only by forming two blow holes 70, 71 in the piston rod 22 and the space S through which oil passes between the needle member 72 and the piston rod 22.

Other constitutions and the manner of operation of this embodiment are substantially equal to the corresponding constitutions and manner of operation of the first embodiment.

Although the embodiments of the present invention have been explained in detail in conjunction with drawings heretofore, the specific constitutions of the present invention are not limited to the embodiments, and design changes or the like which are made without departing from the gist of the present invention are also included in the present invention.

Figure 6:
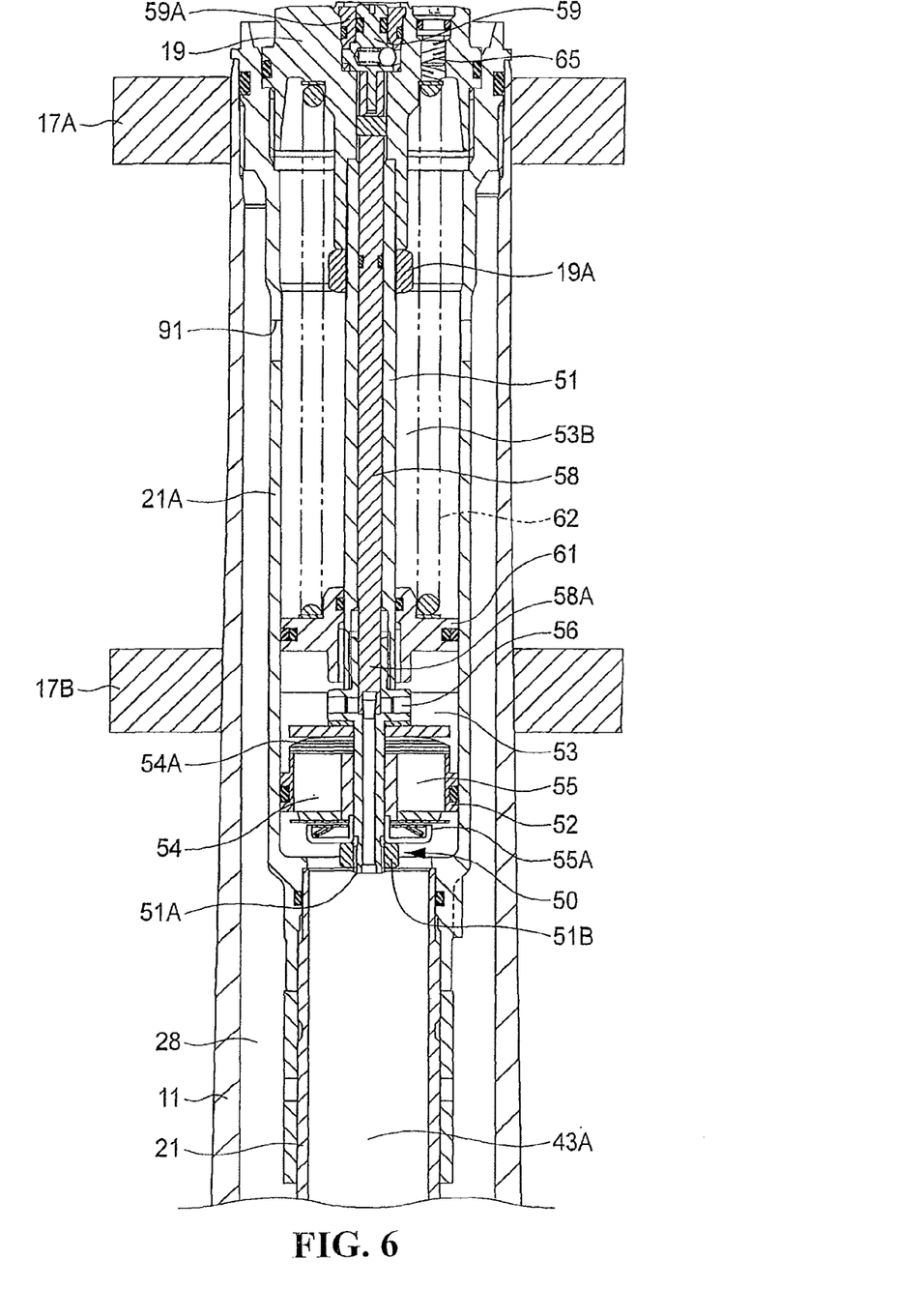
FIG. 6 is an enlarged cross-sectional view showing an essential part of a front fork according to a modification of the present invention.

In the above-mentioned embodiment, the volume compensation chamber 53B may be a hermetically sealed structure. However, as shown in FIG. 6, the volume compensation chamber 53B and the gas chamber 28 may be in communication with each other by forming a blow hole 91 in the upper cylinder tube 21A which defines the volume compensation chamber 53B of the present invention therein. In this case, it is unnecessary to provide the adjustment plug 67 and it is sufficient to provide only the exhaust plug 65.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front fork comprising:
a vehicle-body-side tube and a wheel-side tube slidably engaged with each other in fitting engagement;
a damper cylinder disposed upright in the inside of vehicle-body-side tube;
a piston rod disposed upright in an inside of wheel-side tube and inserted into the inside of the damper cylinder;
a main piston mounted on the piston rod such that the main piston is brought into slidable contact with an inner peripheral surface of the damper cylinder and partitions the inside of the damper cylinder into a rod-side oil chamber and a piston-side oil chamber, and includes a damping force generating device;
a sub piston slidably disposed in the inside of the damper cylinder above the main piston, said sub piston being brought into slidable contact with the inner peripheral surface of the damper cylinder for partitioning the inside of the damper cylinder into the piston-side oil chamber and a sub tank chamber, and includes a compression-side damping force generating device;
a free piston disposed in the inside of the damper cylinder above the sub piston for pressurizing an oil chamber in the inside of the damper cylinder;
a sealing cap mounted on an opening portion below the damper cylinder, for allowing the piston rod to penetrate therethrough, and includes a seal member which is brought into slidable contact with an outer periphery of the piston rod, for hermetically sealing the oil chambers in the inside of the damper cylinder from the oil chamber outside the damper cylinder; and
a communication passage is formed in the piston rod for allowing the oil chambers in the inside of the damper cylinder and the oil chamber outside the damper cylinder to be in communication with each other when the front fork assumes a predetermined extension position from a ride-on stopping time to a fork maximum extended time, wherein the communication passage is an escape portion formed on an outer periphery of the piston rod facing the seal member in an opposed manner at the predetermined extension position of the front fork.

2. The front fork according to claim 1, wherein the communication passage is provided so as to allow the oil chambers in the inside of the damper cylinder and the oil chamber outside the damper cylinder to be in communication with each other when the front fork assumes an extension position at least at the fork maximum extended time.

3. The front fork according to claim 1, wherein the escape portion includes a straight portion having a uniform outer diameter ranging from the predetermined extension position of the front fork to the main piston side.

4. The front fork according to claim 2, wherein the escape portion includes a straight portion having a uniform outer diameter ranging from the predetermined extension position of the front fork to the main piston side.

5. The front fork according to claim 1, wherein the communication passage is formed of a first blow hole radially penetrating the piston rod on a more main-piston side than an axial position of the piston rod which faces the seal member when the front fork assumes the predetermined extension position, and a second blow hole which radially penetrates the piston rod on a more opposite main-piston side than the axial position.

6. The front fork according to claim 2, wherein the communication passage is formed of a first blow hole radially penetrating the piston rod on a more main-piston side than an axial position of the piston rod which faces the seal member when the front fork assumes the predetermined extension position, and a second blow hole which radially penetrates the piston rod on a more opposite main-piston side than the axial position.

7. The front fork according to claim 1, and further including a guide bushing operatively positioned between the piston rod and the sealing cap, said guide bushing being disposed below the seal member.

8. The front fork according to claim 1, and further including a damping force adjusting rod disposed within a hollow portion of the piston rod and being operatively advanced or retracted in an axial direction for controlling a flow passage area of a bypass passage formed in a piston holder disposed between the piston-side oil chamber and the rod-side oil chamber, and further including a rebound spring which surrounds the piston rod and is supported on the sealing cap, wherein the piston holder is mounted on the piston rod and abuts on an upper side of the rebound spring, thus providing a stretch-out damping effect.

9. A front fork comprising:

a vehicle-body-side tube and a wheel-side tube operatively slidably engaged relative to each other;

a damper cylinder operatively disposed within the vehicle-body-side tube;

a piston rod operatively disposed within the wheel-side tube and inserted into the inside of the damper cylinder;

a main piston mounted on the piston rod wherein the main piston is in slidable contact with an inner peripheral surface of the damper cylinder for partitioning the inside of the damper cylinder into a rod-side oil chamber and a piston-side oil chamber, and includes a damping force generating device;

a sub piston slidably disposed within the damper cylinder above the main piston, said sub piston being in slidable contact with the inner peripheral surface of the damper cylinder for partitioning the inside of the damper cylinder into the piston-side oil chamber and a sub tank chamber, and includes a compression-side damping force generating device;

a free piston disposed within the damper cylinder above the sub piston for pressurizing an oil chamber within the damper cylinder;

a sealing cap operatively mounted on an opening portion below the damper cylinder, for allowing the piston rod to penetrate therethrough, said sealing cap includes a seal member in slidable contact with an outer periphery of the piston rod, for hermetically sealing the oil chambers within the damper cylinder from the oil chamber outside the damper cylinder; and a communication passage formed in the piston rod for allowing the oil chambers within the damper cylinder and the oil chamber outside the damper cylinder to be in communication with each other when the front fork assumes a predetermined extension position from a ride-on stopping time to a fork maximum extended time;

wherein the communication passage is an escape portion formed on an outer periphery of the piston rod facing the seal member in an opposed manner at the predetermined extension position of the front fork.

10. The front fork according to claim 9, wherein the communication passage is provided so as to allow the oil chambers within the damper cylinder and the oil chamber outside the damper cylinder to be in communication with each other when the front fork assumes an extension position at least at the fork maximum extended time.

11. The front fork according to claim 9, wherein the escape portion includes a straight portion having a uniform outer diameter ranging from the predetermined extension position of the front fork to the main piston side.

12. The front fork according to claim 10, wherein the escape portion includes a straight portion having a uniform outer diameter ranging from the predetermined extension position of the front fork to the main piston side.

13. The front fork according to claim 9, wherein the communication passage includes a first blow hole radially penetrating the piston rod on a more main-piston side than an axial position of the piston rod which faces the seal member when the front fork assumes the predetermined extension position, and a second blow hole which radially penetrates the piston rod on a more opposite main-piston side than the axial position.

14. The front fork according to claim 10, wherein the communication passage includes a first blow hole radially penetrating the piston rod on a more main-piston side than an axial position of the piston rod which faces the seal member when the front fork assumes the predetermined extension position, and a second blow hole which radially penetrates the piston rod on a more opposite main-piston side than the axial position.

15. The front fork according to claim 9, and further including a guide bushing operatively positioned between the piston rod and the sealing cap, said guide bushing being disposed below the seal member.

16. The front fork according to claim 9, and further including a damping force adjusting rod disposed within a hollow portion of the piston rod and being operatively advanced or retracted in an axial direction for controlling a flow passage area of a bypass passage formed in a piston holder disposed between the piston-side oil chamber and the rod-side oil chamber, and further including a rebound spring which surrounds the piston rod and is supported on the sealing cap, wherein the piston holder is mounted on the piston rod and abuts on an upper side of the rebound spring, thus providing a stretch-out damping effect.

* * * * *